(12) United States Patent
Sajassi et al.

(10) Patent No.: US 9,559,951 B1
(45) Date of Patent: Jan. 31, 2017

(54) PROVIDING INTRA-SUBNET AND INTER-SUBNET DATA CENTER CONNECTIVITY

(71) Applicant: Cisco Technology, Inc., San Jose, CA (US)

(72) Inventors: Ali Sajassi, San Ramon, CA (US); Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 375 days.

(21) Appl. No.: 14/013,201

(22) Filed: Aug. 29, 2013

(51) Int. Cl.
*H04L 12/721* (2013.01)

(52) U.S. Cl.
CPC .................................... *H04L 45/66* (2013.01)

(58) Field of Classification Search
CPC ....................................................... H04L 45/66
See application file for complete search history.

(56) References Cited

U.S. PATENT DOCUMENTS

| | | | |
|---|---|---|---|
| 8,483,183 B2 | 7/2013 | Liu | |
| 8,892,706 B1* | 11/2014 | Dalal | H04L 12/4641 709/222 |
| 8,953,590 B1* | 2/2015 | Aggarwal | H04L 12/4675 370/389 |
| 9,019,814 B1* | 4/2015 | Mohanty | H04L 45/00 370/219 |
| 2007/0237159 A1* | 10/2007 | Yamada | H04L 12/2834 370/395.53 |
| 2008/0170578 A1* | 7/2008 | Ould-Brahim | H04L 12/4641 370/401 |
| 2008/0232384 A1* | 9/2008 | Miyabe | H04L 12/2856 370/401 |
| 2008/0267187 A1* | 10/2008 | Kulmala | H04L 12/4641 370/392 |
| 2009/0296568 A1* | 12/2009 | Kitada | H04L 45/00 370/221 |
| 2010/0290446 A1 | 11/2010 | Atreya | |
| 2010/0329265 A1* | 12/2010 | Lapuh | H04L 12/4645 370/395.53 |
| 2011/0138058 A1* | 6/2011 | Ishida | H04L 12/4633 709/227 |
| 2011/0142053 A1* | 6/2011 | Van Der Merwe | H04L 47/72 370/395.1 |
| 2011/0286452 A1* | 11/2011 | Balus | H04L 12/4641 370/390 |
| 2014/0101336 A1 | 4/2014 | Yang | |

(Continued)

OTHER PUBLICATIONS

Ali Sajassi et al.; "E-VPN Seamless Interoperability with IP-VPN"; draft-sajassi-l2vpn-evpn-ipvpn-interop-01; L2VPN Workgroup Internet-Draft; Oct. 22, 2012; pp. 1-14.

(Continued)

*Primary Examiner* — Khaled Kassim
(74) *Attorney, Agent, or Firm* — P. Su

(57) ABSTRACT

In one embodiment, a method includes a method includes obtaining traffic, determining a host Media Access Control (MAC) address, and determining a host Internet Protocol (IP) address using the traffic. The method also includes generating an Ethernet virtual private network (E-VPN) MAC route advertisement that includes both the host MAC address and the host IP address and generating an IP virtual private network (IP-VPN) route advertisement that includes the host IP address.

6 Claims, 8 Drawing Sheets

(56) References Cited

U.S. PATENT DOCUMENTS

| | | | |
|---|---|---|---|
| 2014/0126422 A1* | 5/2014 | Bragg | H04L 12/462 370/255 |
| 2015/0003463 A1* | 1/2015 | Li | H04L 45/507 370/395.53 |
| 2015/0016461 A1* | 1/2015 | Qiang | H04L 45/74 370/392 |

OTHER PUBLICATIONS

Ali Sajassi et al,; "A Network Virtualization Overlay Solution using E-VPN"; draft-sajassi-nvo3-evpn-overlay-01; NVO3 Workgroup Internet-Draft; Oct. 22, 2012; pp. 1-16.

R. Aggarwal et al.; "Data Center Mobility based on E-VPN, BGP/MPLS IP VPN, IP Routing and NHRP"; Network Working Group Internet Draft; Jun. 10, 2013; pp. 1-24.

* cited by examiner

PROVIDING INTRA-SUBNET AND INTER-SUBNET DATA CENTER CONNECTIVITY

TECHNICAL FIELD

The disclosure relates generally to network based services. More particularly, the disclosure relates to providing intra-subnet and inter-subnet data center connectivity.

BACKGROUND

Ethernet Virtual Private Network (E-VPN) is a layer 2 virtual private network (VPN) technology, and is based on Multiprotocol Label Switching (MPLS). Internet Protocol VPN (IP-VPN) is a layer 3 VPN technology which is generally also based on MPLS.

In many networks, soft switches which run on a virtual machine (VM) or a hypervisor hosted on a server are used to provide efficient intra-server inter-virtual machine switching, flexibility, and ease of provisioning as a part of server orchestration. Servers on which soft switches run on a VM or a hypervisor are multi-homed to Top-of-Rack (ToR) switches using multi-chassis link aggregation groups (LAGs).

Some ToR switches offer layer 3 connectivity to associated, e.g., attached, servers. Although layer 3 connectivity generally allows intra-subnet and inter-subnet traffic to be forwarded, the use of layer 3 connectivity to support intra-subnet and inter-submit traffic forwarding may be inefficient and may cause issues which impact the performance of a network. By way of example, unknown Internet Protocol (IP) destination addresses may be dropped with layer 3 forwarding, media access control (MAC) addresses of originating hosts may be set to addresses of Network Virtualize Endpoints (NVEs), an IP time-to-live (TTL) may be decremented thereby causing applications which confine traffic by setting an IP TTL to a value of one to no longer function, and/or mechanisms which rely on layer 2 connectivity may no longer function as expected.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
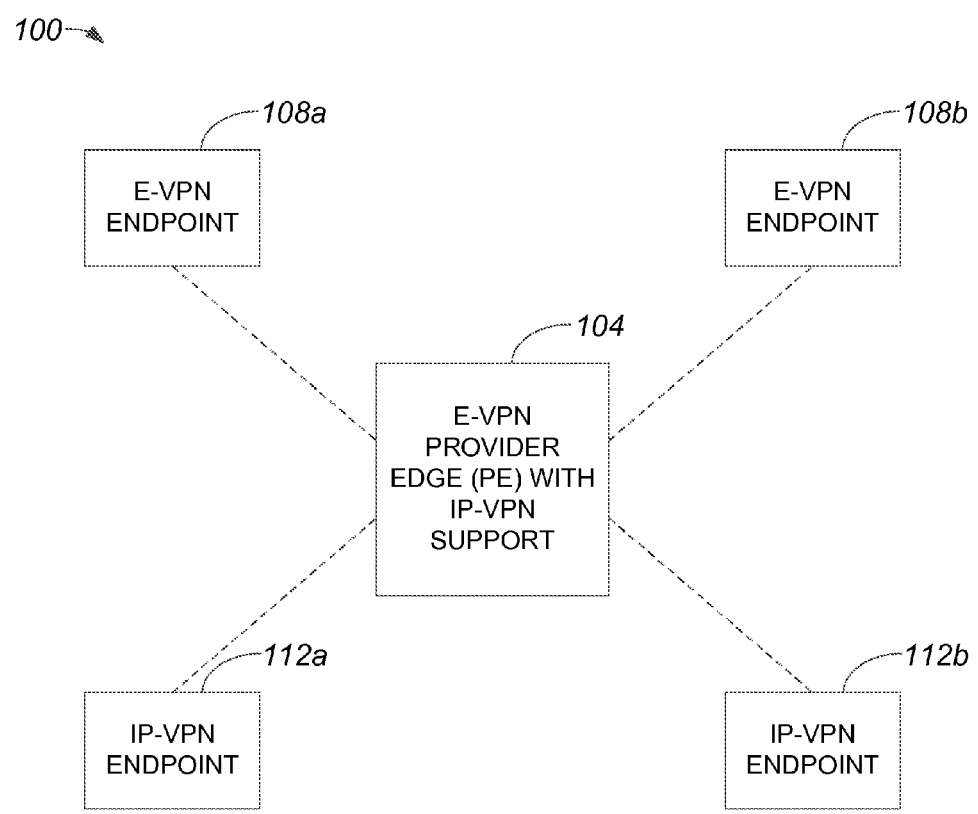
FIG. 1 is a diagrammatic representation of a network in which an Ethernet Virtual Private Network (E-VPN) provider edge (PE) seamlessly interconnects with E-VPN endpoints and Internet Protocol VPN (IP-VPN) endpoints in accordance with an embodiment.

According to one aspect, a method includes obtaining traffic, determining a host Media Access Control (MAC) address, and determining a host Internet Protocol (IP) address using the traffic. The method also includes generating an Ethernet virtual private network (E-VPN) MAC route advertisement that includes both the host MAC address and the host IP address and generating an IP virtual private network (IP-VPN) route advertisement that includes the host IP address.

DESCRIPTION

Ethernet Virtual Private Network (E-VPN) may be an integral part of an Integrated Routing and Bridging (IRB) solution that performs unicast and multicast forwarding for layer 2 (L2) traffic, e.g., intra-subnet forwarding, as well as unicast and multicast forwarding for layer 3 (L3) traffic, e.g., inter-subnet forwarding. A network in which IRB is supported, in addition to relatively seamless interoperability between E-VPN and Internet Protocol (IP) VPN (IP-VPN), allows switches and/or routers running a Border Gateway Protocol (BGP) to efficiently support intra-subnet and inter-subnet data center connectivity.

In one embodiment, an IRB solution that is based on E-VPN may interoperate substantially seamlessly with IP-VPN network elements over Multiprotocol Label Switching (MPLS) and IP networks. A data center network (DCN) that includes an E-VPN that supports E-VPN endpoints and IP-VPN endpoints allows efficient forwarding for intra-subnet switching and efficient forwarding for inter-subnet switching within the DCN as well as across different DCNs. By allowing an E-VPN provider edge device to effectively communicate using E-VPN to E-VPN speakers, e.g., endpoints, and to effectively communicate using IP-VPN with IP-VPN speakers, e.g., endpoints, the E-VPN provider edge device may be used to effectively support interoperation of E-VPN speakers and IP-VPN speakers.

Substantially seamless operation between E-VPN and IP-VPN may generally be such that an IP-VPN speaker, e.g, an IP-VPN provider edge device, in communication with an E-VPN provider edge device is effectively unaware that it is in communication with the E-VPN provider edge device and not an IP-VPN provider edge device. An E-VPN provider edge device that supports both E-VPN and IP-VPN efficiently forwards intra-subnet traffic, and efficiently forwards inter-subnet traffic by allowing an E-VPN media access control (MAC) advertisement route to carry an IP address and a MAC address.

In one embodiment, an E-VPN node, e.g., an E-VPN provider edge device, supports integrated routing and/or bridging as well as interoperability with layer 3 VPNs. For example, an E-VPN provider edge device may use a BGP control plane to integrate routing and/or bridging by substantially seamlessly integrating IP-VPN and E-VPN. An E-VPN provider edge device may substantially simultaneously use E-VPN routes to advertise MAC and IP reachability to E-VPN nodes for inter-subnet traffic and intra-subnet traffic, and use IP-VPN routes to advertise IP reachability to remote IP-VPN provider edge devices for inter-subnet traffic. As will be appreciated by those skilled in the art, inter-subnet traffic is generally layer 3 traffic forwarded between different subnets, while intra-subnet traffic is generally layer 2 traffic forwarded within a particular subnet.

Referring initially to FIG. 1, a network in which an E-VPN provider edge device substantially seamlessly interconnects to E-VPN endpoints and IP-VPN endpoints will be described in accordance with an embodiment. A network 100, which may be a data center network (DCN), includes an E-VPN provider edge device 104 that is arranged to support both E-VPN and IP-VPN. E-VPN provider edge device 104 may be a router configured to route traffic within network 100 using Border Gateway Protocol (BGP) and/or Multiprotocol Label Switching (MPLS).

As shown, E-VPN provider edge device 104 is in communication with E-VPN endpoints 108a, 108b and IP-VPN endpoints 112a, 112b. In the described embodiment, E-VPN provider edge device 104 may obtain data, e.g., packets, from and forward the data to E-VPN endpoints 108a, 108b and IP-VPN endpoints 112a, 112b.

Figure 2:
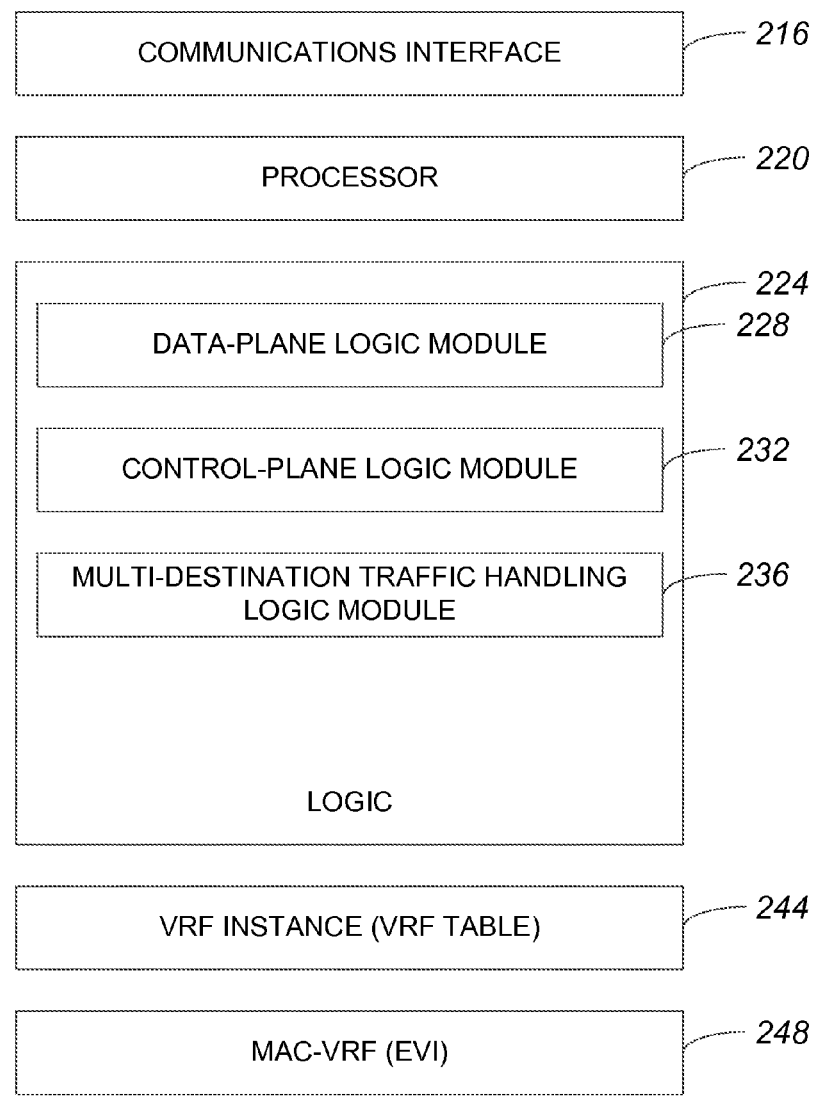
FIG. 2 is a diagrammatic representation of an E-VPN provider edge device, e.g., E-VPN provider edge device 104 of FIG. 1, in accordance with an embodiment.

E-VPN provider edge device 104 generally includes functionality which allows E-VPN provider edge device 104 to support both E-VPN and IP-VPN, as mentioned above. FIG. 2 is a diagrammatic representation of an E-VPN provider edge device, e.g., E-VPN provider edge device 104 of FIG. 1, in accordance with an embodiment. An E-VPN provider edge device 104, or an E-VPN node, includes a communications interface 216, a processor 220, a logic arrangement 224, at least one virtual routing and forwarding (VRF) instance 244, and at least one MAC-VRF or E-VPN instance (EVI) 248.

Communications interface 216 is generally configured to allow E-VPN provider edge device 104 to communicate on a network, e.g., with E-VPN speakers and/or IP-VPN speakers. Typically, communications interface 216 includes at least one input/output port (not shown) that is arranged to receive traffic and to forward traffic.

Processor 220 is configured to execute software logic associated with logic arrangement 224. Logic arrangement 224 includes a data-plane logic module 228, a control-plane logic module 232, and a multi-destination traffic handling logic module 236. Data-plane logic module 228 is generally arranged to support the forwarding of packets which originate at endpoints, e.g., end-station devices, to other endpoints. Control-plane logic module 232 is generally arranged to support the forwarding of packets associated with the creation and/or the operation of an overall network of which E-VPN provider edge device 104 is a component. Multi-destination traffic handling logic module 236 is configured to process traffic, e.g., packets, intended for more than one destination, e.g., endpoint.

E-VPN provider edge device 104 also includes at least one VRF instance 244 and at least one MAC-VRF or EVI 248. In general, a one-to-many-mapping is established between each VRF instance 244 and an MAC-VRF, as will be discussed below with reference to FIG. 3. MAC-VRF may have multiple associated bridge domains that use a VLAN-aware bundling service interface. In one embodiment, a bridge domain may map to a unique IP subnet within a VRF context.

Figure 3:
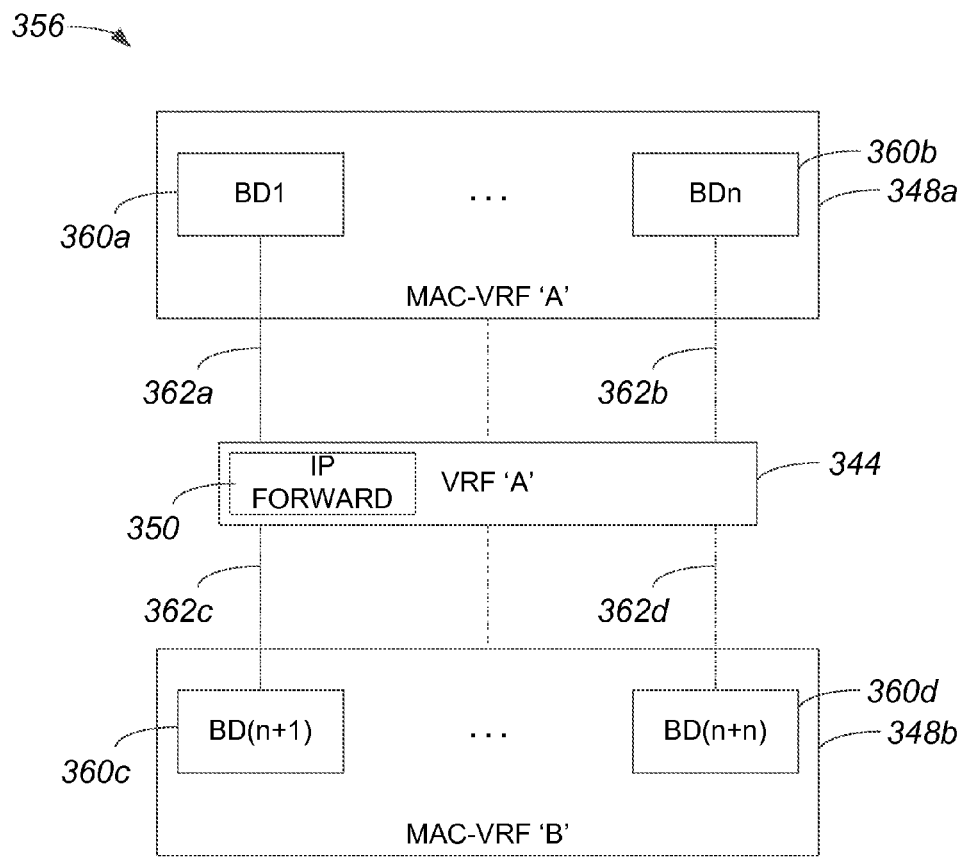
FIG. 3 is a block diagram representation of a mapping between a Media Access Control virtual routing and forwarding instance (MAC-VRF), e.g., E-VPN instances (EVIs), and an IP-VPN virtual routing and forwarding (VRF) instance within an E-VPN provider edge device in accordance with an embodiment.

As mentioned above, substantially seamless interoperability with respect to E-VPN and IP-VPN may be achieved by an E-VPN provider edge device. In general, an E-VPN provider edge device that supports routing of E-VPN traffic and routing of IP-VPN traffic may establish a many-to-one mapping between MAC-VRFs and an IP-VPN VRF instance. Each MAC-VRF may have any number of associated bridge domains that may each map to a substantially unique IP subnet within a VRF context. That is, each MAC-VRF may have multiple associated bridge domains that each map to a substantially unique IP subnet. FIG. 3 is a block diagram representation of a mapping between MAC-VRFs and a VRF instance within an E-VPN provider edge device in accordance with an embodiment. An E-VPN provider edge device 356 includes a plurality of MAC-VRFs 348a, 348b. Although two MAC-VRFs 348a, 348b are shown for ease of illustration, it should be appreciated that E-VPN provider edge device 356 may generally include any number of MAC-VRFs.

As shown, MAC-VRF 'A' 348a and MAC-VRF 'B' 348b are mapped to a VRF instance 344. A single MAC-VRF 348a, 348b per tenant may generally be mapped to a single VRF instance. As will be appreciated by those skilled in the art, within a multi-tenant data center, a tenant is typically a subscriber which leases virtual data center services from the operator of the data center. Typically, more than one MAC-VRF 348a, 348b may share the same VRF instance 344. MAC-VRF 'A' 348a has a plurality of bridge domains 360a, 360b, while MAC-VRF 'B' 348b has a plurality of bridge domains 360c, 360d. In the described embodiment, each bridge domain 360a-d may have an associated bridged virtual interface (BVI) 362a-d, respectively. A BVI 362a-d is a layer 3 router interface and terminates layer 2. It should be appreciated that substantially all BVIs 362a, 362b associated with MAC-VRF 'A' 348a are effectively placed in the same VRF instance, e.g., VRF instance 344, while substantially all BVIs 362c, 362d associated with MAC-VRF 'B' 348b are also effectively placed in the same VRF instance, e.g., VRF instance 344.

VRF instance 344 may include a VRF table, as for example an IP forwarding table 350, that may be shared between E-VPN and IP-VPN. IP forwarding table 350 may generally store IP addresses associated with routes identified in advertisement routes. An IP lookup may be performed using IP forwarding table 350.

Figure 4:
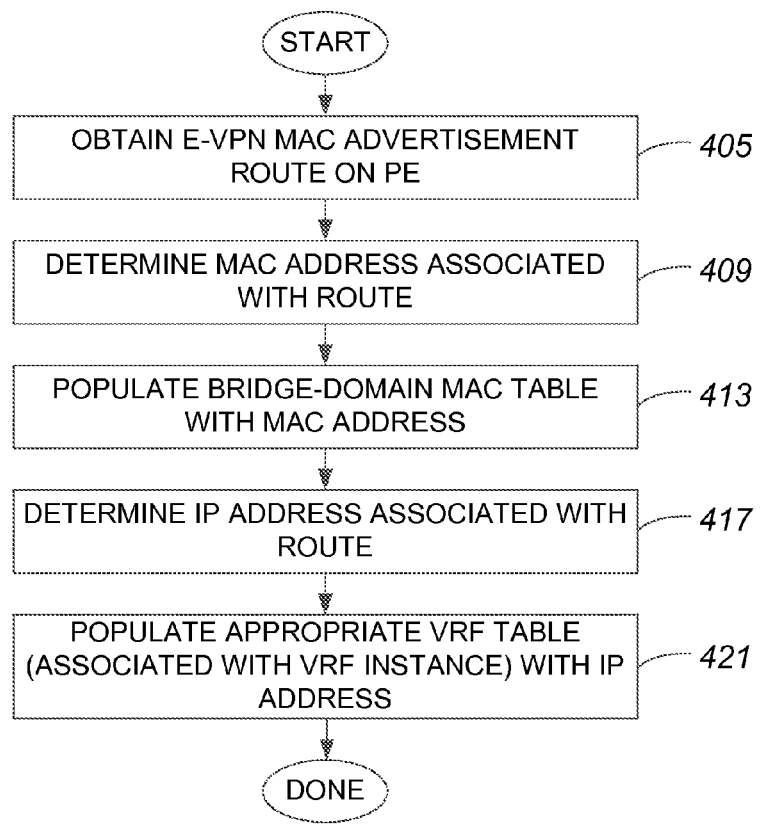
FIG. 4 is a process flow diagram which illustrates a method of processing an E-VPN media access control (MAC) advertisement route in accordance with an embodiment.

FIG. 4 is a process flow diagram which illustrates a method of processing an E-VPN MAC advertisement route in accordance with an embodiment. A method 401 of processing an E-VPN MAC advertisement route begins at step 405 in which the E-VPN MAC advertisement route is obtained on an E-VPN provider edge device. Once the E-VPN MAC advertisement route is obtained, the MAC address associated with the route, i.e., the route associated with the advertisement, is determined in step 409. The MAC address determined in step 409 is used to populate a bridge-domain MAC table in step 413.

In step 417, an IP address associated with the route is determined, After the IP address is determined, an appropriate VRF table, i.e., an appropriate VRF table associated with a VRF instance, is populated in step 421 with the IP address. The method of processing an E-VPN MAC advertisement route is completed once the appropriate VRF table is populated.

Figure 5:
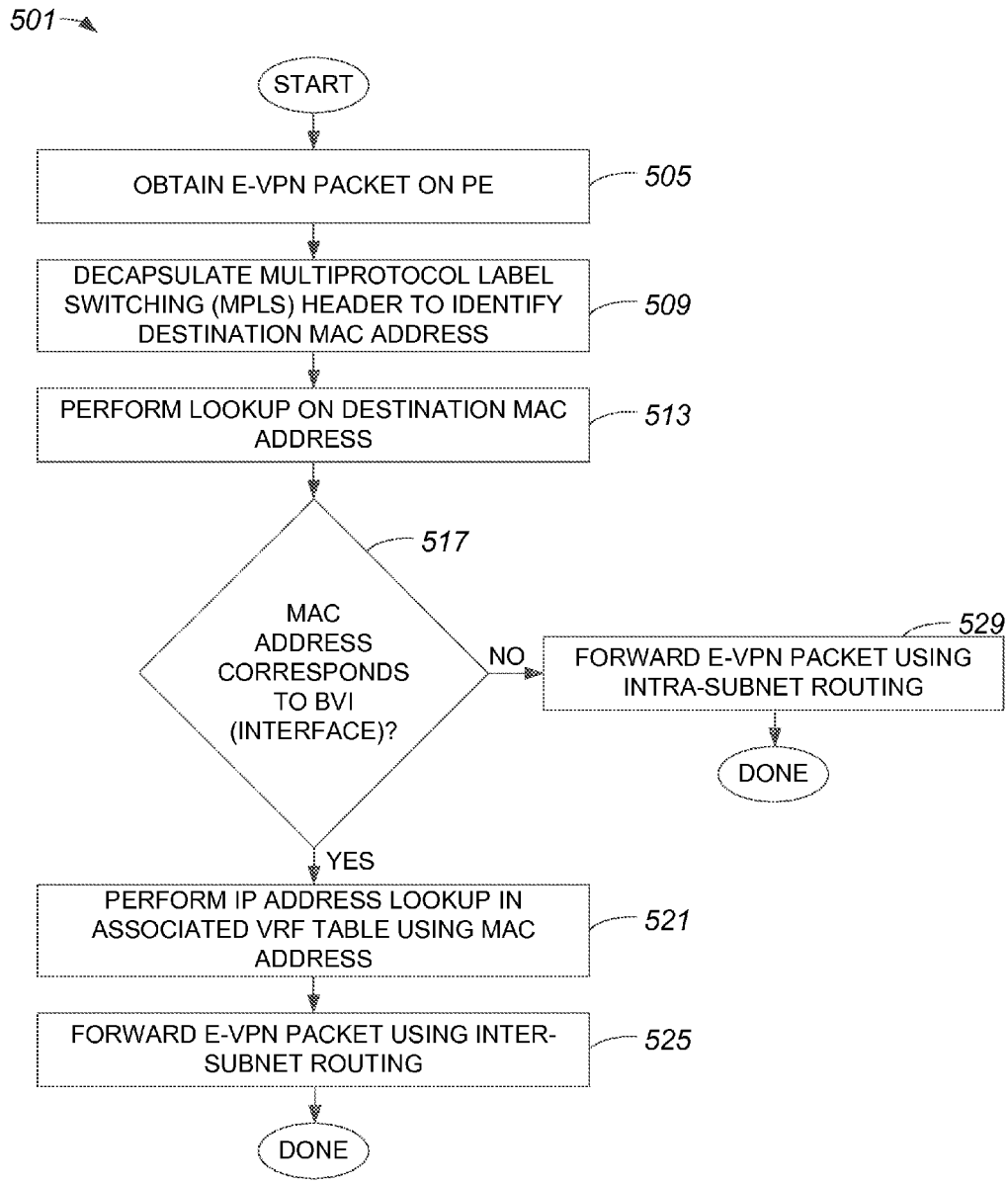
FIG. 5 is a process flow diagram which illustrates a method of processing an E-VPN packet in accordance with an embodiment.

With reference to FIG. 5, a method of processing an E-VPN packet obtained by an E-VPN provider edge device will be described in accordance with an embodiment. A method 501 of processing an E-VPN packet begins at step 505 in which an E-VPN packet, e.g., an E-VPN data packet, is obtained on a provider edge device. Once the E-VPN packet is obtained, an MPLS header of the E-VPN packet is decapsulated in step 509 in order to identify a destination MAC address, e.g., the destination for the E-VPN packet. A lookup is performed in step 513 using the destination MAC address. The lookup that is performed may generally include, but is not limited to including, using an MPLS VPN label to index into an appropriate bridge domain MAC table.

After the lookup is performed, it is determined in step 517 whether the destination MAC address corresponds to a BVI. If the destination MAC address corresponds to a BVI, then an IP address lookup is performed in step 521. The IP address lookup may be performed by using, for example, a bridge-domain identifier to index into an associated VRF table, i.e., a VRF table associated with an appropriate VRF instance. Once the IP address lookup is performed, the E-VPN packet is forwarded in step 525 using inter-subnet routing. The method of processing an E-VPN packet is completed upon the E-VPN packet being forwarded using inter-subnet routing.

Alternatively, if it is determined in step 517 that the destination MAC address does not correspond to a BVI, the indication is that the E-VPN packet is an intra-subnet packet, or a packet that is to be intra-subnet switched. Thus, an IP address lookup is not needed, and process flow moves to step 529 in which the E-VPN packet is forwarded using intra-subnet routing. Once the packet is forwarded using intra-subnet routing, the method of processing an E-VPN packet is completed.

Figure 6:
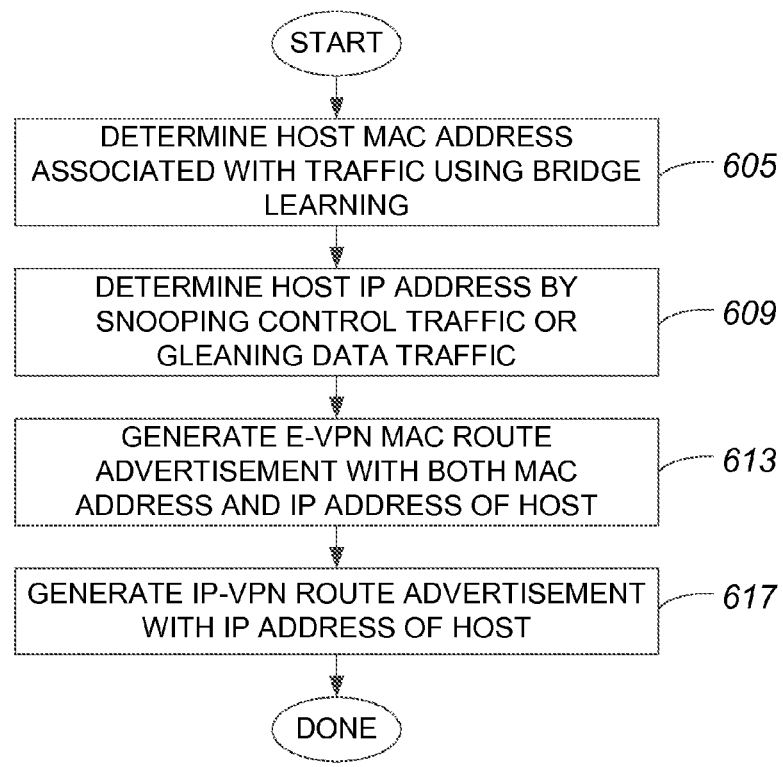
FIG. 6 is a process flow diagram which illustrates a method of advertising a route in accordance with an embodiment.

FIG. 6 is a process flow diagram which illustrates a method used by an E-VPN provider edge device to advertise at least one route in accordance with an embodiment. A method 601 of advertising at least one route begins at step 605 in which a host MAC address associated with traffic is determined, e.g., using bridge learning. In one embodiment, the host MAC address may be an address associated with a virtual machine. Once the host MAC address is determined, a host IP address may be determined in step 609. The host IP address may be determined, for example, by snooping control traffic using address resolution protocol (ARP) or dynamic host configuration protocol (DHCP). Alternatively, the host IP address may be determined by effectively gleaning, or parsing, data traffic.

After the host IP address is determined, the E-VPN provider edge device effectively has two addresses which identify the host, e.g., a MAC/IP address tuple. Upon obtaining a MAC/IP address tuple, two routes associated with the MAC/IP address tuple may generally be advertised. As such, in step 613, an E-VPN MAC route advertisement is generated using both the MAC address of the host and the IP address of the host. That is, an E-VPN MAC route advertisement advertises both the MAC address and the IP address of the host. The E-VPN MAC route advertisement is generally used to advertise reachability to E-VPN nodes or speakers which may receive traffic. The E-VPN MAC route advertisement may be generated using an L2 VPN address family identifier (AFI) or an E-VPN subsequent address family identifier (SAFI), as well as associated Network Layer Reachability Information (NLRI).

An IP-VPN route advertisement is generated in step 617 using the IP address of the host. The IP-VPN route may be generated using an IP-VPN AFI or SAFI, as well as associated NLRI. In general, the IP-VPN route advertisement may be used to advertise reachability to IP-VPN nodes or speakers which may receive traffic. Once two routes are advertised, the method of advertising at least one route is completed.

It should be appreciated that a received E-VPN MAC advertisement route generally includes, or carries, an IP address for a host and a MAC address for the host. The MAC address carried in a received E-VPN MAC advertisement route may be installed into an appropriate bridge-domain MAC table of an associated MAC-VRF, and the IP address carried in the received E-VPN route may be placed into a suitable VRF table. When a MAC address is installed in a bridge-domain MAC table of an associated MAC-VRF, the MAC address is generally installed in the bridge-domain MAC table associated with a subnet corresponding to an Ethernet Tag that is encoded in the received E-VPN MAC advertisement route.

In one embodiment, for a given tenant, a IP-VPN provider edge device may share substantially only IP-VPN routes for some of its associated subnets with an E-VPN provider edge device. When substantially only IP-VPN routes from some associated subnets are effectively provided to an E-VPN provider edge device by a IP-VPN provider edge device, then one route may be selected for use as a common route between the IP-VPN provider edge device and the E-VPN provider edge device for common subnets.

As will be appreciated by those skilled in the art, traffic to be processed by an E-VPN provider edge device may include multi-destination traffic, or traffic that is to be forwarded to more than one destination. E-VPN utilizes an MPLS label for a split-horizon, e.g., a label which is used to effectively prevent a multi-destination frame from entering into a routing loop, while IP-VPN does not utilize such an MPLS label. In one embodiment, multi-destination traffic may be processed such that an MPLS label for a split-horizon, or a split-horizon label, may be included when traffic is forwarded to an E-VPN speaker and such that a split-horizon label is not included when traffic is forwarded to an IP-VPN speaker.

Figure 7A:
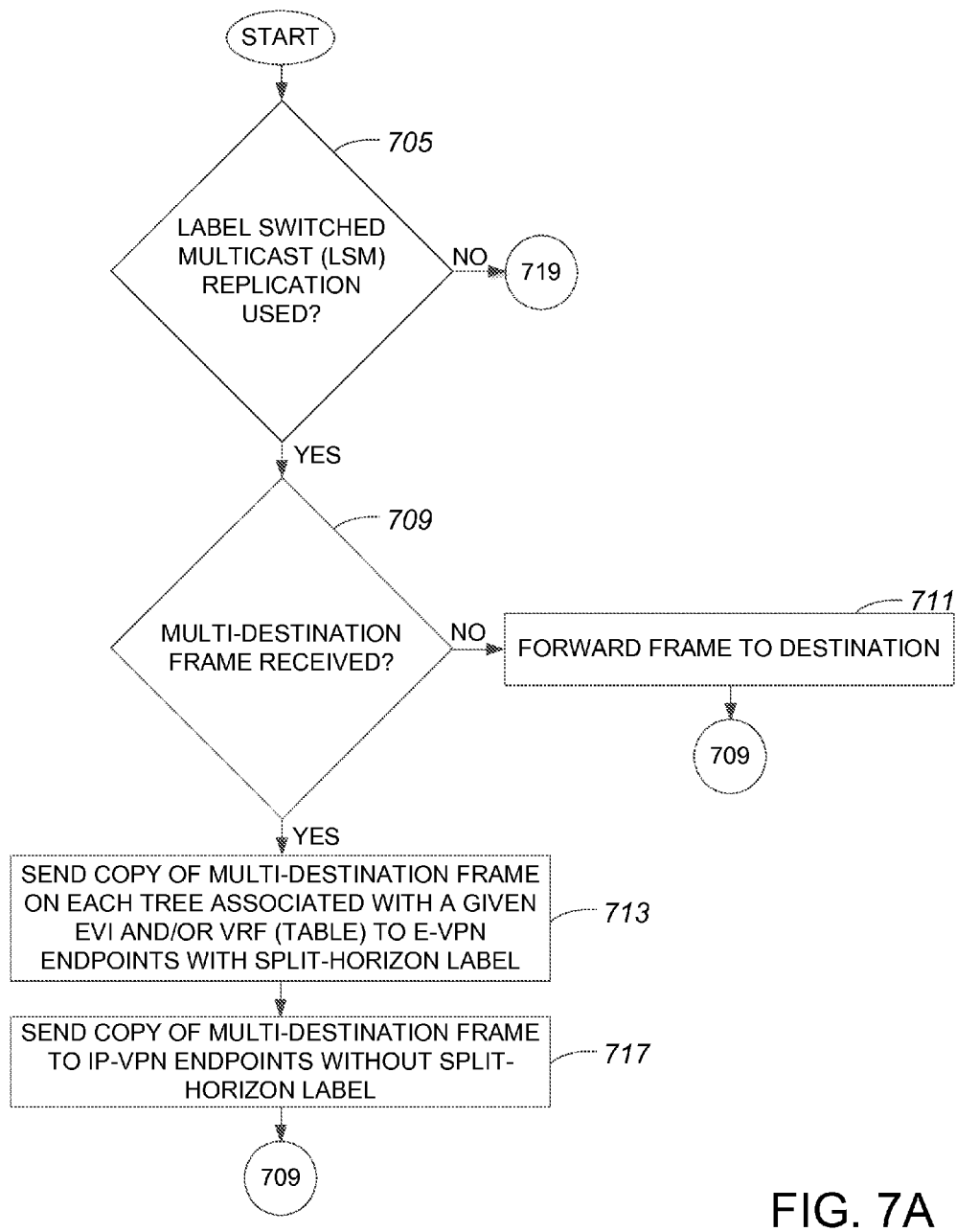
FIGS. 7A and 7B are a process flow diagram which illustrates a method of processing multi-destination traffic in accordance with an embodiment.
Figure 7B:
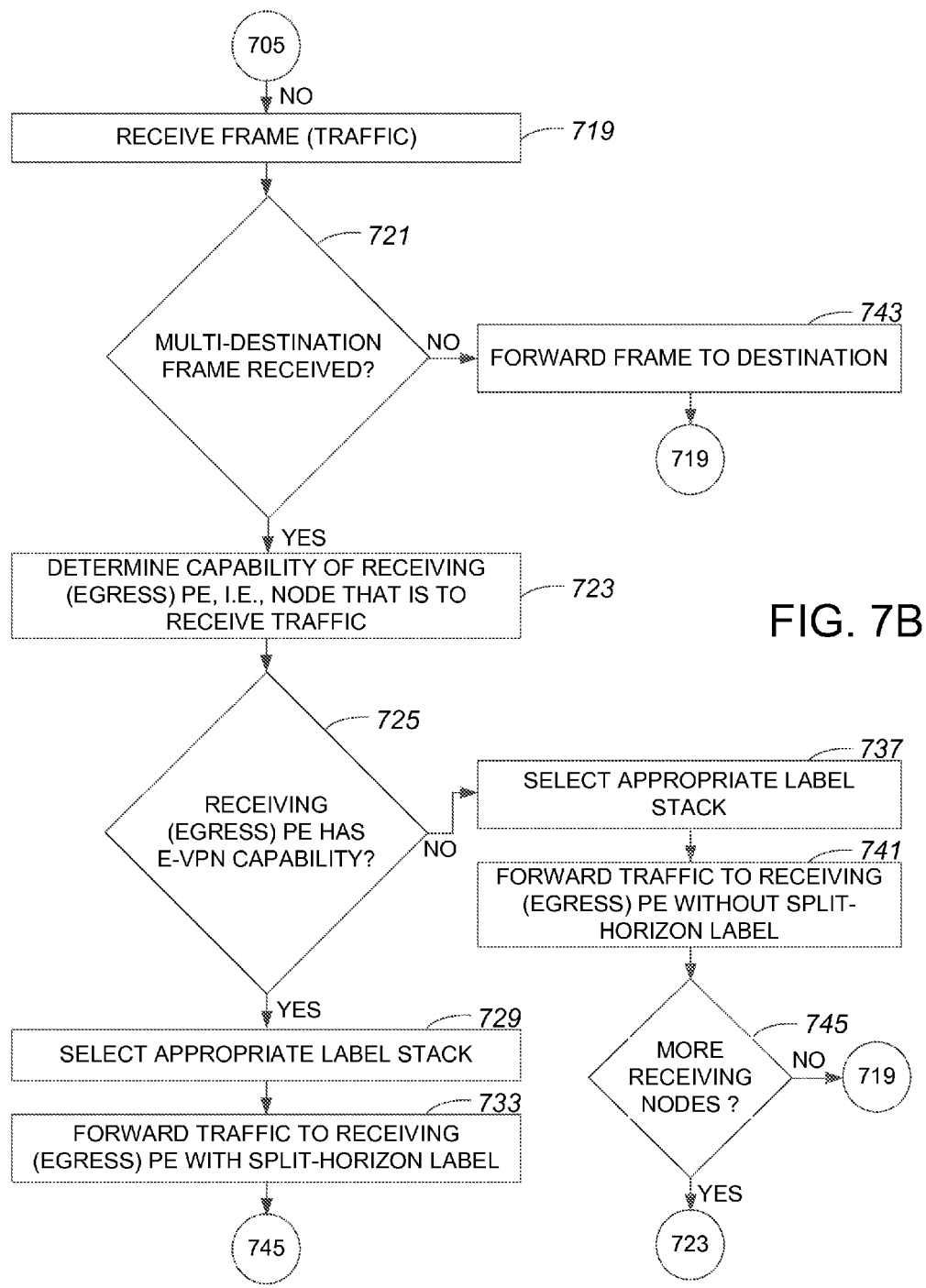

FIGS. 7A and 7B are a process flow diagram which illustrates a method of processing multi-destination traffic in accordance with an embodiment. A method 701 of processing multi-destination traffic begins at step 705 in which a determination as to whether label switched multicast (LSM) replication is to be used to effectively forward traffic. Within a network which utilizes LSM, there may be two sets of point-to-multipoint (P2MP) multicast trees that may be used by E-VPN provider edge devices. One set of P2MP multicast trees is arranged to encompass substantially only E-VPN endpoints, while the other set of P2MP multicast trees is arranged to encompass substantially only IP-VPN endpoints.

If the determination in step 705 is that LSM replication is to be used, process flow moves to step 709 in which it is determined if a multi-destination frame has been received or otherwise obtained. If it is determined in step 709 that a multi-destination frame has not been received, the indication is that a received frame is not to be forwarded to multiple destinations. Accordingly, in step 711, the frame is forwarded to its destination using any suitable forwarding method. After the frame is forwarded to its destination, process flow returns to step 709 in which it is determined whether a multi-destination frame has been received.

Returning to step 709, if it is determined that a multi-destination frame has been received, then a copy of the multi-destination frame is sent in step 713 on each P2MP multicast tree associated with a given EVI and/or VRF to E-VPN endpoints. It should be appreciated that each copy sent on an E-VPN tree associated with a given EVI and/or VRF to E-VPN endpoints is generally sent with a split-horizon label.

In step 717, a copy of the multi-destination frame is sent to IP-VPN endpoints without a split-horizon label in step 717. That is, a copy of the multi-destination frame is sent on a P2MP multicast tree that is associated with IP-VPN endpoints. Once the copy of the multi-destination frame is sent to IP-VPN endpoints, process flow returns to step 709 in which a determination is made as to whether a multi-destination frame is received.

Referring back to step 705, if the determination is that LSM replication is not to be used to replicate traffic, the indication is that a different type of replication is to be used. In the described embodiment, if it is determined that LSM replication is not to be used to replicate traffic, the implication is that ingress replication is to be used to replicate traffic. As such, process flow moves from step 705 to step 719 in which a frame or, more generally, traffic is received or otherwise obtained. Once traffic is received, it is determined in step 721 whether the traffic or the frame is intended for multiple destinations, e.g., whether the frame is a multi-destination frame. If the frame is not a multi-destination frame, then the frame is forwarded to an appropriate destination in step 743, and process flow returns to step 719 in which another frame, or more traffic, is received.

Alternatively, if it is determined in step 721 that a multi-destination frame has been received, then a capability of a provider edge device that is to receive, or otherwise obtain, the traffic is determined in step 723. That is, in step 723, the capability of a node that is to receive traffic may be ascertained. A receiving provider edge device may be assessed to identify an appropriate label stack, as well as to determine whether the receiving provider edge device may understand a split-horizon label. As will be appreciated by those skilled in the art, MPLS packets typically have a two-label stack and, thus, identifying an appropriate label stack may include determining which label in the two-label stack is to be utilized.

A determination is made in step 725 as to whether the receiving, or egress, provider edge device has E-VPN capability. If it is determined that the receiving provider edge device has E-VPN capability, then an appropriate label stack is selected in step 729, and traffic is forwarded to the receiving provider edge device with a split-horizon label in step 733. Once the traffic is forwarded to the receiving provider edge device, it is determined in step 745 whether there are more receiving nodes, or receiving provider edge devices, to effectively process. That is, it is determined in step 745 whether there are more receiving provider edge devices that are to receive the multi-destination frame. If the determination in step 745 is that there are more receiving nodes to process, then process flow returns to step 723 in which the capability of another receiving provider edge device is determined. On the other hand, if it is determined that there are no more receiving nodes to process, then process flow returns to step 719 in which traffic is received or otherwise obtained.

Returning to step 725, if it is determined in step 725 that the receiving provider edge device does not have E-VPN capability, then the indication is that the receiving provider edge device has IP-VPN capability. Accordingly, an appropriate label stack is selected in step 737, and traffic is forwarded to the receiving provider edge device without a split-horizon label in step 741. After traffic is forwarded to the receiving provider edge device without the split-horizon label, process flow moves to step 745 in which it is determined whether there are more receiving nodes to process.

Although only a few embodiments have been described in this disclosure, it should be understood that the disclosure may be embodied in many other specific forms without departing from the spirit or the scope of the present disclosure. By way of example, the use of an E-VPN provider edge device that is capable of supporting E-VPN and IP-VPN has been described as being suitable for use in data center applications in which either intra-subnet forwarding or inter-subnet forwarding alone may be insufficient. It should be appreciated, however, that an E-VPN provider edge device that is capable of supporting E-VPN and IP-VPN is not limited to being used in data center applications in which either intra-subnet forwarding or inter-subnet forwarding alone may be insufficient.

E-VPN endpoints and IP-VPN endpoints may generally include a suitable network element, e.g., device which communicates on a network. Typically, an E-VPN endpoint may be configured to interoperate with an IP-VPN provider edge device In one embodiment, an E-VPN provider edge device may interoperate with an IP-VPN provider edge device that may be, but is not limited to being, an IP-VPN client site that accesses cloud services, an IP-VPN Top-of-Rack (ToR) switch, and/or an IP-VPN gateway.

The embodiments may be implemented as firmware, hardware, and/or software logic embodied in a tangible medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. By way of example, steps associated with determining a MAC address and determining an IP address associated with processing a E-VPN MAC advertisement route in FIG. 4 may occur substantially in parallel. Therefore, the present examples are to be considered as illustrative and not restrictive, and the examples is not to be limited to the details given herein, but may be modified within the scope of the appended claims.

What is claimed is:
1. A method comprising:
   obtaining traffic, wherein obtaining the traffic includes obtaining a packet, the packet being associated with a multi-destination frame;
   determining a host Media Access Control (MAC) address;
   determining a host Internet Protocol (IP) address using the traffic;
   generating an Ethernet virtual private network (E-VPN) MAC route advertisement that includes both the host MAC address and the host IP address; and
   generating an IP virtual private network (IP-VPN) route advertisement that includes the host IP address;
   determining when label-switched multicast (LSM) replication is used;

forwarding the packet using intra-subnet routing when it is determined that LSM replication is used, wherein forwarding the packet using the intra-subnet routing includes sending a first copy of the packet with a split-horizon label to E-VPN endpoints; and sending a second copy of the packet without the split-horizon label to IP-VPN endpoints when it is determined that LSM replication is used.

2. A method comprising:

obtaining traffic, wherein obtaining the traffic includes obtaining a packet;

determining a host Media Access Control (MAC) address;

determining a host Internet Protocol (IP) address using the traffic;

generating an Ethernet virtual private network (E-VPN) MAC route advertisement that includes both the host MAC address and the host IP address;

generating an IP virtual private network (IP-VPN) route advertisement that includes the host IP address;

determining when a destination node associated with the traffic has E-VPN capability;

forwarding the packet using intra-subnet routing when it is determined that the destination node has E-VPN capability, wherein forwarding the packet using the intra-subnet routing includes forwarding a split-horizon label to the destination node when it is determined that the destination node has E-VPN capability; and forwarding the packet using inter-subnet routing when it is determined that the destination node does not have E-VPN capability.

3. A tangible, non-transitory computer-readable medium comprising computer program code, the computer program code, when executed, configured to:

obtain traffic;

determine a host Media Access Control (MAC) address;

determine a host Internet Protocol (IP) address using the traffic;

generate an Ethernet virtual private network (E-VPN) MAC route advertisement that includes both the host MAC address and the host IP address; and generate an IP virtual private network (IP-VPN) route advertisement that includes the host IP address, wherein the computer code operable to obtain the traffic is operable to obtain a packet, the packet being associated with a multi-destination frame, and wherein when label switched multicast (LSM) replication is used, the computer code is further operable to forward the packet using intra-subnet routing, wherein the computer code operable to forward the packet using the intra-subject routing is operable to sending a first copy of the packet with a split-horizon label to E-VPN endpoints, and send a second copy of the packet without the split-horizon label to IP-VPN endpoints.

4. A tangible, non-transitory computer-readable medium comprising computer program code, the computer program code, when executed, configured to:

obtain traffic;

determine a host Media Access Control (MAC) address;

determine a host Internet Protocol (IP) address using the traffic;

generate an Ethernet virtual private network (E-VPN) MAC route advertisement that includes both the host MAC address and the host IP address;

generate an IP virtual private network (IP-VPN) route advertisement that includes the host IP address, wherein the computer code operable to obtain the traffic is operable to obtain a packet;

determine when a destination node associated with the traffic has E-VPN capability;

forward the packet using intra-subnet routing when it is determined that the destination node has E-VPN capability, wherein the computer code operable to forward the packet using intra-subnet routing is operable to forward a split-horizon label to the destination node when it is determined that the destination node has E-VPN capability; and forward the packet using inter-subnet routing when it is determined that the destination node does not have E-VPN capability.

5. An apparatus comprising:

a processor; and logic embodied in a tangible, non-transitory computer-readable medium, the logic arranged to obtain traffic, determine a host Media Access Control (MAC) address, determine a host Internet Protocol (IP) address using the traffic, generate an Ethernet virtual private network (E-VPN) MAC route advertisement that includes both the host MAC address and the host IP address, and generate an IP virtual private network (IP-VPN) route advertisement that includes the host IP address, wherein the logic arranged to obtain the traffic is further arranged to obtain a packet, the packet being associated with a multi-destination frame, and wherein when label switched multicast (LSM) replication is used, and wherein the is logic further arranged to forward the packet using intra-subnet routing, wherein the logic arranged to forward the packet using the intra-subnet routing is operable to send a first copy of the packet with a split-horizon label to E-VPN endpoints, and send a second copy of the packet without the split-horizon label to IP-VPN endpoints.

6. An apparatus comprising:

a processor; and logic embodied in a tangible, non-transitory computer-readable medium, the logic arranged to obtain traffic, determine a host Media Access Control (MAC) address, determine a host Internet Protocol (IP) address using the traffic, generate an Ethernet virtual private network (E-VPN) MAC route advertisement that includes both the host MAC address and the host IP address, and generate an IP virtual private network (IP-VPN) route advertisement that includes the host IP address, wherein the logic arranged to obtain the traffic is further arranged to obtain a packet, and wherein the logic is further arranged to determine when a destination node associated with the traffic has E-VPN capability, forward the packet using intra-subnet routing when it is determined that the destination node has E-VPN capability, wherein the logic arranged to forward the packet using the intra-subnet routing is operable to forward a split-horizon label to the destination node when it is determined that the destination node has E-VPN capability, and forward the packet using inter-subnet routing when it is determined that the destination node does not have E-VPN capability.

* * * * *